3,214,280
Oct. 26, 1965

3,214,280
ANTIFOULING PAINT
Wilbur S. Taylor, Norwalk, Conn., assignor to R. T. Vanderbilt Company, Inc., New York, N.Y., a corporation of New York
No Drawing. Filed July 25, 1961, Ser. No. 126,529
15 Claims. (Cl. 106—15)

The present invention pertains to paints and more particularly to marine antifouling paints and to a process for protecting underwater surfaces from marine fouling organisms using the marine antifouling paints.

The present application is a continuation-in-part of pending application Serial No. 779,831, filed December 12, 1958, and now abandoned.

Marine fouling organisms may either destroy, corrode or merely become attached to the underwater surfaces of marine structures; the last is a serious problem on the underwater surfaces of movable marine structures, e.g., heavy barnacle growth on a ship hull can slow the ship speed up to 50% and on a seaplane hull can make takeoffs unsafe or impossible. These, however, are only representative examples of the great economic damage done by marine fouling organisms, including crustaceans (barnacles), mollusks (boring worms and boring clams), annelids (tubeworms), tunicates, algae, coelenterates, etc.

Many methods, including chemical, mechanical and electrical, have been considered in combating the marine fouling problem, but none has been entirely successful from the point of view of effectiveness, convenience and economy.

Creosote impregnation has been used on wooden surfaces, but this is not satisfactory when paint is involved, since the creosote bleeds through the paint. Antifouling paints have been developed which include materials toxic to fouling organisms. One of these is a special paint formulation that provides for controlled release of cuprous oxide in sufficient quantity to be poisonous to the organisms. However, all of these paints are expensive, difficult to apply and must be applied at frequent intervals.

It is, therefore, an object of the present invention to provide a marine antifouling paint which is highly efficacious in protecting underwater surfaces from marine fouling organisms and to provide a process for using the same.

The marine antifouling paint of the present invention contains a novel antifouling agent, namely 1,2,3-trichloro-4,6-dinitrobenzene. This antifouling agent can be used in varying amounts depending upon the extent and duration of protection desired. In general, the antifouling agent is present in a marine antifouling paint in an amount from about 12% to about 44% based on the weight of the paint, or in an amount from about 15% to about 75% based on the solids content of the paint.

The nature of the marine paint to which the novel antifouling agent is added is in no way critical to the present invention, since the antifouling agent has been found to be compatible with all marine paints. Thus, the marine paints to which the novel antifouling agent may be added contain a film-forming base, typical examples of which include drying or semi-drying oils, such as linseed oil, dehydrated castor oil, soya bean oil, oiticica oil etc.; esters of the acids derived from the drying or semi-drying oils and polyhydric alcohols, such as glycerol, ethylene glycol, sorbitol, etc.; the pure esters of the drying or semi-drying oil fatty acids, such as linoleic acid, oleic acid, etc., and polyhydric alcohols, such as ethylene glycol, glycerol, mannitol, etc.; drying or semi-drying oil modified resins, such as the modified alkyd resins prepared, for example, by the esterification of glycerol, phthalic anhydride and the drying or semi-drying oil fatty acids; the modified phenolic resins prepared, for example, by the reaction of cresols, formaldehyde and the drying or semi-drying oils; gum rosin and the modified esters of rosin or modified rosins prepared for example, by the esterification of rosin, glycerol or pentaerythritol and the drying or semi-drying oil fatty acids; modified latex emulsions, such as butadiene-styrene copolymers; vinyl polymers, such as the copolymer of vinyl chloride-vinyl acetate-vinyl alcohol; and other conventional film-forming bases.

The antifouling marine paints will also generally contain pigments, which term as used herein includes extenders, fillers and thickeners, such as titanium dioxide, carbon black, calcium carbonate, wood flour, clay, diatomaceous earth, bentonite, etc. Marine antifouling paint will also contain conventional volatile solvents, such as toluene, xylol, turpentine, etc. If desired, thinners, such as mineral spirits, plasticizers, such as tricresyl phosphate, metallic driers, such as the metal salts of carboxylic acid, e.g., naphthenates, oleates, linoleates, octoates and resinates of maganese, lead, cobalt, calcium and iron, may be incorporated in the marine antifouling paints.

The product and process of the invention will be illustrated by the following examples.

*Example 1*

Paints were formulated based on government specifications for antifouling paints as follows: 89.5 parts of gum rosin, 44.5 parts of hydrogenated methyl ester of rosin (Hercolyn), 30 parts of diatomaceous earth (Celite 289), 56 parts xylol, and 0, 30 or 60 parts of 1,2,3-trichloro-4,6-dinitrobenzene. Percent composition of each of these paints may be expressed as follows:

| Material Percent based on— | Paint A | | Paint B | | Control Paint C | |
|---|---|---|---|---|---|---|
| | Paint | Solids | Paint | Solids | Paint | Solids |
| 1,2,3-trichloro-4,6-dinitrobenzene | 12.0 | 15.5 | 21.4 | 26.8 | 0 | 0 |
| Gum rosin | 35.8 | 46.1 | 32.0 | 39.9 | 40.7 | 54.6 |
| Hercolyn | 17.8 | 22.9 | 15.9 | 19.9 | 20.2 | 27.0 |
| Celite 289 | 12.0 | 15.5 | 10.7 | 13.4 | 13.6 | 18.3 |
| Xylol | 22.4 | -------- | 20.0 | -------- | 25.4 | -------- |

A second control paint was a commercial copper bottom paint of unknown composition which is marketed under the trade name "Woolsey."

Steel plates, each 8 inches square, were covered with a chromate undercoat, air dried, and the various paints applied to duplicate plates, two with the chromate undercoat only also being retained. The ten plates were then attached about an inch apart to a 2" by 4" pine board and submerged for twelve weeks in Long Island Sound so that they were covered at low tide.

At the end of this period, the four plates (and surrounding wooden areas) having the control paint and the chromate undercoat only were completely covered with large barnacles. The plates having copper bottom paint, and the surrounding wooden areas, had no barnacles. The two plates having paint A, containing 12% of 1,2,3-trichloro-4,6-dinitrobenzene, had lost most of their paint film (believed to be the result of poor paint formulation and having no relation to the efficacy of the toxicant), yet there were only a few small barnacles near the edges and on the wood areas surrounding the plates. The plates having paint B, containing 21.4% of 1,2,3-trichloro-4,6-dinitrobenzene, had retained most of the paint film and had one small barnacle on one plate only and a few small barnacles on the wooden area surrounding the plates. The commercial copper control plates had no barnacles, although one panel was almost devoid of film.

This test shows that 1,2,3-trichloro-4,6-dinitrobenzene compares very favorably with commercial copper ship-bottom paints in protecting steel plates from growth of fouling organisms.

*Example 2*

A vinyl-based paint formulated from 104.59 parts by weight of a copolymer of vinyl chloride (91 parts)-vinyl acetate (3 parts)-vinyl alcohol (6 parts) [Bakelite VAGH resin containing 2.3% hydroxyl groups], 79.8 parts toluol, 313.76 parts methylisobutyl ketone, 9.36 bentonite thickener (Bentone 18-C), and 26.17 tricresyl phosphate plasticizer. The batch was divided and to part of it was added 1,2,3-trichloro-4,6-dinitrobenzene at the rate of 420.19 parts per 104.59 parts of VAGH resin (44.05% by weight of the finished formulation or 75% by weight solids). The remainder of the paint was used without any antifouling agent. These paints were brushed onto 8″ by 10″ masonite boards which were submerged for nine months in Florida waters at Miami. The boards were examined after each month of submersion and the percent prevention of fouling by all types of marine fouling organisms was recorded. Additional controls used were two commercial copper antifouling paints, e.g., "Red Hand" and "Copper Pac" (Dolfonite Company). Results are presented in the table below:

| Months | Percent prevention of fouling after exposure | | | | | | | | |
|---|---|---|---|---|---|---|---|---|---|
| | 1 | 2 | 3 | 4 | 5 | 6 | 7 | 8 | 9 |
| Formulation: | | | | | | | | | |
| Vinyl paint with 1,2,3-trichloro-4,6-dinitrobenzene | 100 | 100 | 100 | 100 | 100 | 88 | 89 | 87 | 86 |
| Control | 0 | 0 | 0 | 0 | 0 | 0 | 0 | 0 | 0 |
| Red Hand control | 93 | 85 | 18 | 54 | 0 | 0 | 0 | 0 | 0 |
| Copper Pac control | 100 | 94 | 100 | 100 | 100 | 85 | 67 | 84 | 47 |

These results show that when applied in a vinyl copolymer resin base paint, 1,2,3-trichloro-4,6-dinitrobenzene is very efficacious as an antifouling agent and is even better than copper antifouling paints.

The composition and process of the invention may be modified by those skilled in the art in addition to the ways noted above without departing from the spirit thereof and accordingly the invention is to be limited only within the scope of the appended claims.

I claim:

1. A marine antifouling paint composition for protecting underwater surfaces from marine fouling organisms containing pigment, film-forming paint base, volatile solvent and 1,2,3-trichloro-4,6-dinitrobenzene as an antifouling agent.

2. A marine antifouling paint composition as set forth in claim 1 wherein the antifouling agent is present therein in an amount from about 12% to about 44% by weight of the composition.

3. A marine antifouling paint composition for protecting underwater surfaces from marine fouling organisms containing pigment, a copolymer of vinyl chloride-vinyl acetate-vinyl alcohol as a film forming paint base, volatile solvent and 1,2,3-trichloro-4,6-dinitrobenzene as an antifouling agent.

4. A marine antifouling paint as set forth in claim 3 wherein the antifouling agent is present therein in an amount of about 44% by weight of the composition.

5. A process for protecting underwater surfaces from marine fouling organisms comprising applying to said surface a marine antifouling paint composition containing pigment, film-forming paint base, volatile solvent and 1,2,3-trichloro-4,6-dinitrobenzene as an antifouling agent.

6. A process as set forth in claim 5 wherein the antifouling agent is present in the marine antifouling paint in an amount from about 12% to about 44% by weight of the paint.

7. A process for protecting underwater surfaces from marine fouling organisms comprising applying to said surface a marine antifouling paint composition containing pigment, a copolymer of vinyl chloride-vinyl acetate-vinyl alcohol as a film-forming paint base, volatile solvent and 1,2,3-trichloro-4,6-dinitrobenzene as an antifouling agent.

8. A process as set forth in claim 7 wherein the antifouling agent is present in the paint in an amount of about 44% by weight of the paint.

9. A marine antifouling paint composition for protecting underwater surfaces from marine fouling organisms containing pigment, gum rosin as a film-forming paint base, hydrogenated methyl ester of rosin as a film-forming paint base, volatile solvent and 1,2,3-trichloro-4,6-dinitrobenzene as an antifouling agent.

10. A process for protecting underwater surfaces from marine fouling organisms comprising applying to said surface a marine antifouling paint composition containing pigment, gum rosin as a film-forming paint base, hydrogenated methyl ester of rosin as a film-forming paint base, volatile solvent and 1,2,3-trichloro-4,6-dinitrobenzene as an antifouling agent.

11. The process as set forth in claim 10 wherein the antifouling agent is present in the paint in an amount of about 21% by weight of the paint.

12. A marine antifouling paint composition for protecting underwater surfaces from algae, barnacles and other marine fouling organisms which comprises by weight about 105 parts copolymer of vinyl chloride-vinyl acetate-vinyl alcohol as a film-forming paint base, about 80 parts toluol, about 314 parts methylisobutyl ketone, about 9 parts bentonite, about 26 parts tricresyl phosphate and about 420 parts 1,2,3-trichloro-4,6-dinitrobenzene as an antifouling agent.

13. A marine antifouling paint composition for protecting underwater surfaces from algae, barnacles and other marine fouling organisms which comprises by weight about 32% gum rosin as a film-forming paint base, about 16% hydrogenated methyl ester of rosin as a film-forming paint base, about 11% diatomaceous earth, about 20% xylol and about 21% 1,2,3-trichloro-4,6-dinitrobenzene as an antifouling agent.

14. In a paint composition containing pigment, film-forming paint base selected from the group consisting of rosin paint base and vinyl polymer resin paint base and volatile solvent, the improvement which comprises as an additional ingredient 1,2,3-trichloro-4,6-dinitrobenzene as an antifouling agent to form a marine antifouling paint composition for protecting underwater surfaces from marine fouling organisms.

15. In a process for applying a paint composition containing pigment, film-forming paint base selected from the group consisting of rosin paint base and vinyl polymer resin paint base and volatile solvent to underwater surfaces, the improvement which comprises adding 1,2,3-trichloro-4,6-dinitrobenzene as an antifouling agent to form a paint composition for protecting the underwater surfaces from marine fouling organisms.

References Cited by the Examiner

UNITED STATES PATENTS 1,958,418  5/34  Calcott et al. _____ 106—15
2,786,795  3/57  Ligett et al. _____ 167—30

ALEXANDER H. BRODMERKEL, *Primary Examiner.*

JOSEPH REBOLD, MORRIS LIEBMAN, *Examiners.*